Feb. 20, 1962  A. J. ULRICH ETAL  3,022,236
RADIO-FREQUENCY PLASMA CONTAINING DEVICE
Filed Aug. 14, 1959  2 Sheets-Sheet 1
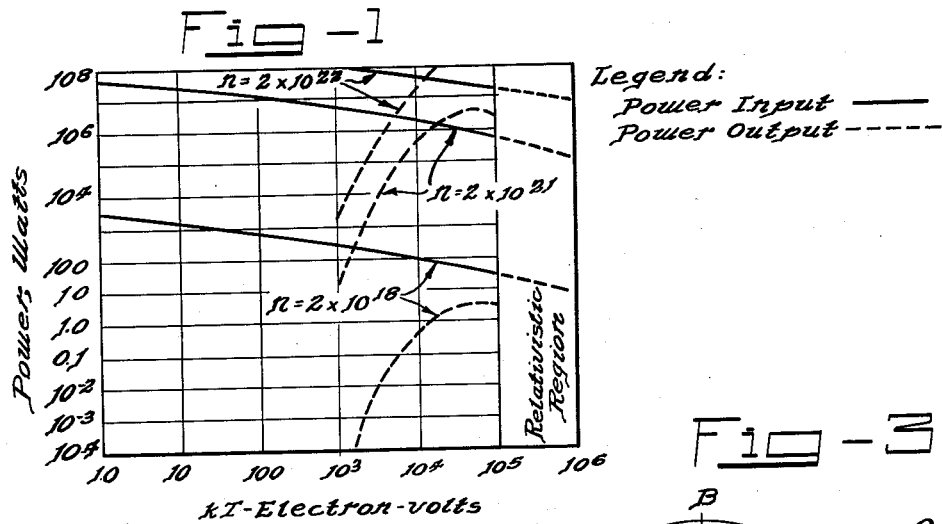
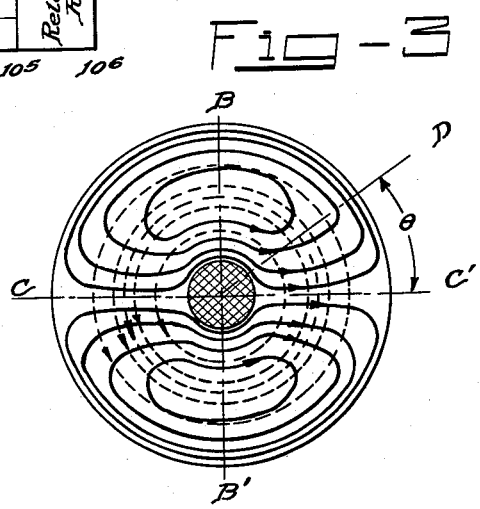
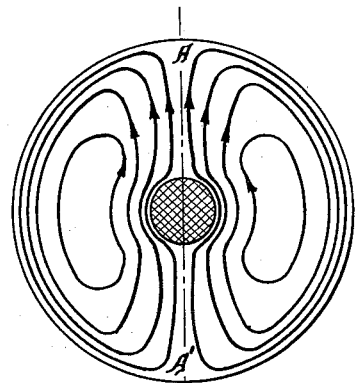
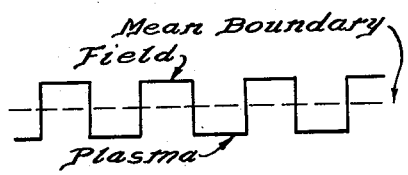
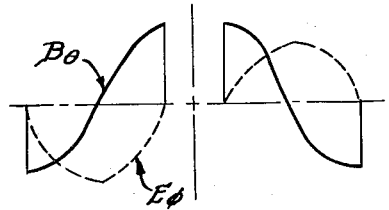
INVENTORS
Aaron J. Ulrich
James W. Butler
Albert J. Hatch
Attorney Feb. 20, 1962  A. J. ULRICH ETAL  3,022,236
RADIO-FREQUENCY PLASMA CONTAINING DEVICE
Filed Aug. 14, 1959  2 Sheets-Sheet 2
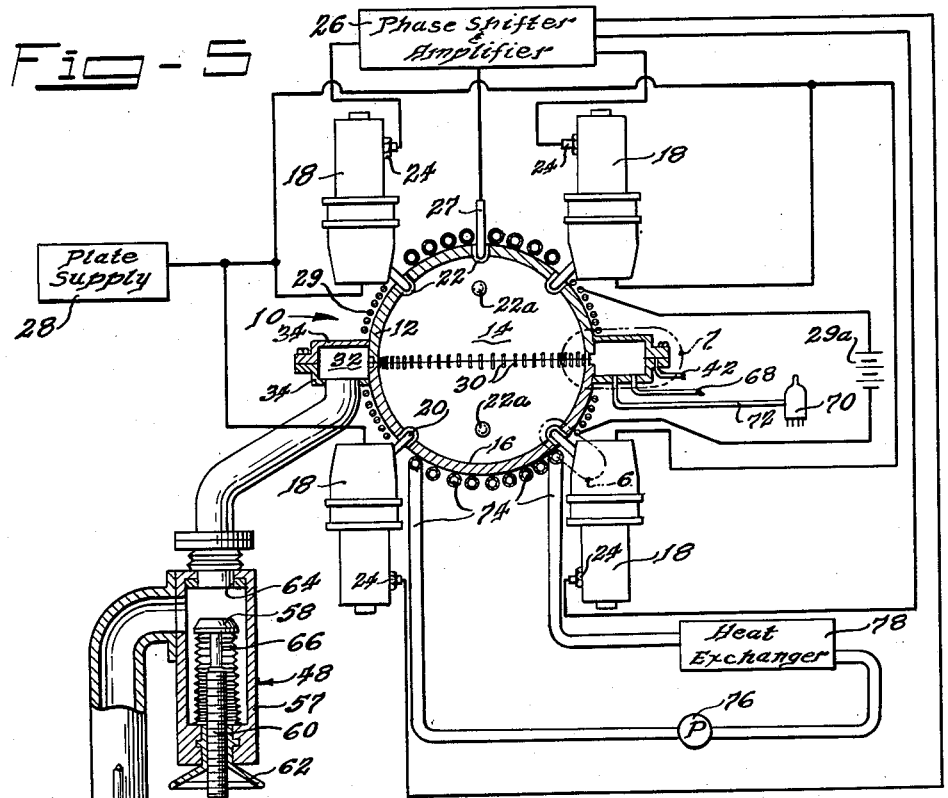
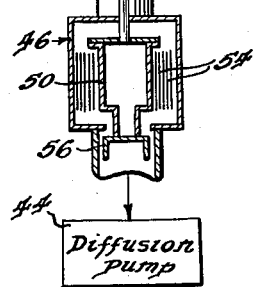
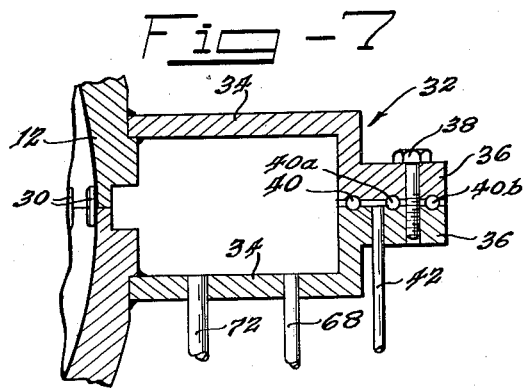
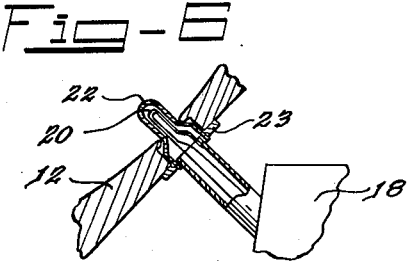
INVENTORS
Aaron J. Ulrich
James W. Butler
Albert J. Hatch
Attorney

United States Patent Office 3,022,236
Patented Feb. 20, 1962

3,022,236
RADIO-FREQUENCY PLASMA CONTAINING DEVICE
Aaron J. Ulrich, Wheaton, James W. Butler, Hinsdale, and Albert J. Hatch, Chicago, Ill., assignors to the United States of America as represented by the United States Atomic Energy Commission
Filed Aug. 14, 1959, Ser. No. 833,894
8 Claims. (Cl. 204—154.2)

The present invention relates generally to methods and means for containing and compressing plasma discharges. More particularly, it relates to the use of radio-frequency electromagnetic waves to contain and compress plasma discharges which may produce thermonuclear-derived neutrons and which may ultimately provide useful power.

It is of importance to define certain terms employed in the following description. The term "plasma" is herein taken to mean a space-charge neutralized ion cloud containing substantially equal numbers of positive ions and negative electrons. The term "radio-frequency machine" signifies for the purpose of the description a reactor in which confining force on the plasma is developed by periodic magnetic or electromagnetic fields.

In addition to the well known fission process, there is another reaction which may be utilized for the release of neutrons and energy. This reaction is generally termed fusion in that it includes the combination of the nuclei of two light elements into a nucleus of a single heavier element. Briefly, certain light elements such as deuterium, tritium, and lithium interact under proper circumstances to produce thermonuclear reactions. Such reactions result from the fusion combination of the nuclei of the reactant elements with the release of subatomic particles such as neutrons and protons, and energy in the form of kinetic energy of the subatomic particles, as well as the nuclei of the newly produced elements. Examples of such reactions are the following:

(1) 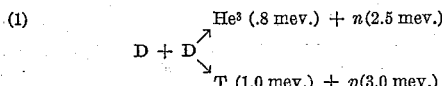

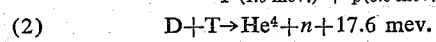

(2)  $D+T \rightarrow He^4+n+17.6$ mev.

For a more detailed description of the above reactions reference is made to an article authored by Richard F. Post in the "Reviews of Modern Physics," September 1956, relating to a survey of controlled fusion research and to vols. 31 and 32, "Peaceful Uses of Atomic Energy," UN, 1958.

The neutrons released in the fusion reactions may be used in well known ways for the irradiation of elements and other substances. The resulting isotopes are useful in industry as well as in basic research. The attendant protons are also useful as an irradiating medium. Reference is made to vol. 19, "Peaceful Uses of Atomic Energy," UN, 1958, for further information regarding industrial and research applications of isotopes.

The thermonuclear reaction would also be highly valuable as a source of power. In order for the thermonuclear reaction to be feasible for production of power, however, there must be an energy balance in the direction of energy released from the reaction and to this end, a minimization of losses in the reaction is necessary. In order to produce a desired energy balance it is necessary for the entire fuel charge or reactant material to be heated to a kinetic temperature sufficient to produce a substantial reaction rate by virtue of the collisions of the fuel nuclei. These kinetic temperatures correspond to mean particle energies of tens or even hundreds of thousands of electron volts. Concerning the particular reaction parameters, such as minimum temperatures and densities necessary for producing thermonuclear reactions for the desired energy balance, reference is made to the book, "Project Sherwood, The U.S. Program in Controlled Fusion," by Amasa S. Bishop, Addison Wesley Publishing Co. Inc., 1958.

It will be appreciated that thermonuclear power provides a possible source of almost unlimited energy and that the energy release in thermonuclear reactions is relatively spectacular as compared to chemical fuels, particularly when the cost of the fuel materials is taken into consideration. The relative abundance of the elements employed in thermonuclear reactions as fuel materials points to the eventual widespread use of this type of reaction. Although known chemical fuels, such as oil and coal, occur in the earth's surface in limited quantities, there is an almost unlimited supply of thermonuclear fuel material to be found in the ocean. The methods and means set forth herein provide a manner of producing thermonuclear reactions which may ultimately lead to successful harnessing of the energy released therefrom.

It will be noted that the reactions, hereinbefore mentioned, involve the collision of atomic particles having like electric charges. A high energy barrier exists between the two particles which must be overcome for a thermonuclear reaction to occur. It is known that thermonuclear reactions provide in large amounts the energies of the sun and the stars. In these bodies the reaction elements are maintained at a very high energy level and in a relatively dense state so that the probability of collision to produce a thermonuclear reaction is increased. The sun and stars utilize their very high gravitational fields to contain the reaction materials in the high density state. The gravitational field on earth, however, is not large enough, and, therefore, the forces of the sun and the stars must be artificially duplicated if thermonuclear reactions are to be produced.

It has been determined that thermonuclear reactions are most likely to occur in high density plasmas in which the kinetic energy of the particles making up the plasma are at a very high energy level. It is necessary that the plasma be contained at a requisite density and that the particles be excited to a proper temperature with respect to the density with either a continuous or some sort of pulsed mode of operation. Although various approaches are possible to the provision of circumstances to further the thermonuclear reaction, the particular approach disclosed herein employs radio-frequency electromagnetic fields wherein a plasma is contained and compressed to increase the density and temperature of the ions therein.

One of the major problems that has been apparent since the conception of the thermonuclear program is the confinement of a plasma of sufficiently high density and temperature for a long enough period of time to enable a thermonuclear reaction to take place. The confinement problem has been limited for the most part to the use of steady magnetic fields, although electric fields were given some consideration early in the project. The major deterring factor in the use of electric fields was that such a field exerts oppositely directed forces on the electrons and positive ions of the plasma so that, if the field was made to confine one component, the other would have a tendency to escape. This invention, however, describes methods and means for confining the plasma particles by electromagnetic fields regardless of their charge, causing them to be compressed in a high density configuration and maintained in a stable condition for a finite period of time.

It is an object of the present invention to provide a method and means for confining and compressing a plasma discharge.

It is another object of the present invention to provide a method and means for producing a stabilized plasma discharge.

It is another object of the present invention to provide a method and means for containing and compressing a plasma discharge by means of radio-frequency electromagnetic fields.

It is a further object of the present invention to provide a device using radio-frequency electro-magnetic fields which is useful as a source of neutrons and other irradiating particles.

Still another object of the present invention is to provide a radio-frequency device which may ultimately lead to the production of useful power by means of nuclear reactions. Various other objects and advantages will be apparent to those skilled in the art from the following description and accompanying drawings wherein:

FIGURE 1 is a graph showing the total resistive power input and the total power output plotted against the plasma energy release for representative values of the plasma density;

FIGURE 2 shows a $TE_{110}$ electromagnetic field in a spherical cavity with a central conducting sphere;

FIGURE 3 shows a rotating field in a spherical cavity with a central conducting sphere;

FIGURE 4 shows a square wave perturbation in the inner face between the plasma and the confining electromagnetic field;

FIGURE 5 is a vertical section view of a device for the practice of this invention with some of its components shown schematically;

FIGURE 6 is an enlarged, fragmentary view of the portion encircled and referenced 6 in FIGURE 5 showing the details of an electromagnetic field coupling loop;

FIGURE 7 is an enlarged, fragmentary section view of the portion encircled and referenced 7 showing the details of construction of the vacuum manifold surrounding the housing.

With the steady state magnetic fields such as employed in the well known "pinch effect" and other magnetic plasma confining machines, instabilities in the confining fields are apt to appear which permit the plasma to escape through the confining walls of the device with substantial loss of power. With a periodic confining force such as utilized in the radio-frequency plasma confining machines, there is opportunity to take advantage of dynamic stabilization effects. Dynamic stabilization of otherwise unstable systems does exist in nature as is evidenced by the frequently cited examples of the inverted pendulum and the alternating gradient focussing system proposed for high energy particle accelerators. It is also possible for a column to support a periodic compression load with an average value greater than the critical buckling force although in this situation, the stability zones are quite narrow.

In the case of radio-frequency confining fields, the organized motions resulting from instabilities tend to be oriented by the confining field at the plasma surface. If this field is then caused to vary rapidly, particularly in direction, the instability motions lose coherence with the field structure and will not develop sufficiently to allow escape of the plasma.

To contain a plasma discharge in a stable configuration and compress it to a density and temperature at which a thermonuclear reaction could take place, a gas formed of light elements such as deuterium or tritium is introduced into a cavity in which an electromagnetic field, preferably rotatable around an axis, may be established. As the electromagnetic field forms and constricts the gas, the temperature increases and the gas becomes fully ionized. As the density of the gas increases, and the energy of the gas ions increases, the collision probability for the positive ions also increases. If the collision probability is sufficiently high a thermonuclear reaction involving the fusion of positive ions will occur, resulting in the release of high energy subatomic particles, such as neutrons and protons, and the release of high energy fusion products, such as helium.

An estimate of minimum power requirements for net power output can be made without reference to particular apparatus. Taking as representative a spherical plasma of diameter 0.2 meter, a graph of the total energy input is displayed in FIG. 1. In the figure, the resistive power input and the total power output are each plotted against the plasma energy release for representative values of the plasma density. The curves are representative of the D–T reaction, the small (approximately 1%) contribution from D–D reactions being ignored. The graph shows that the lower limit of density for a plasma of this particular size is in the neighborhood of $10^{20}/meter^3$ and that at least 0.1 to 1 megawatt of power must be involved.

Turning now to the containment of a plasma discharge, it is well known that a charged particle in a standing electromagnetic wave system experiences, in addition to the forces driving its oscillatory motion, a time average force in a predicted direction. If then, a situation can be created in which the gradient of the time average electric field is everywhere directed toward a common central zone, it is possible to contain a plasma in this zone at least up to a certain density at which instability motions might ensue. The electromagnetic field employed in this invention and hereinafter described has this property. In actual operation of the radio frequency machine, hereinafter described, neutral gas atoms are ionized by collision with electrons in the region of high electric field, the resulting ions and electrons being driven partly toward the center and partly toward the outer wall. Essentially, those ions which are formed inside the electric field maximum as shown in FIG. 2 are driven to the center, the others being carried to the outer wall.

To see the general nature of a machine using the principle of radio-frequency confinement, it is instructive to begin with an estimate of probable reactive power requirements. "Reactive power" as used herein is defined as the peak field energy times the angular frequency of the confining field. An estimate of the reactive power may be made using the expression $2\omega nkT \times$ (field volume) where $\omega$ is the angular frequency of the confining field, $n$ is the density of the plasma, and $kT$ is the energy of the plasma corresponding to temperature T. A plasma temperature of approximately 1 kev. will produce a substantial number of neutrons at a plasma density of about $2 \times 10^{18}$ particles per $meter^3$. The volume of the plasma will be approximately $4.19 \times 10^{-3}$ $meters^3$; the field volume being approximately $10 \times$ the volume of the plasma. Using a frequency of 100 megacycles/second, the reactive power is calculated to be about $1.69 \times 10^4$ megawatts which is quite large and can only be obtained in a very high Q system, Q being a figure of merit equal to $$2\pi \frac{\text{maximum energy stored}}{\text{energy lost per cycle}}$$

at resonance. A comparatively long time scale is thereby implied since, in order to take advantage of the high Q, a time of the order of $q/w$ must be allowed for the field energy to build up to near its final value. It is thus important to eliminate any contact between the plasma and material walls or electrodes due to the attendant large cooling effect.

To fulfill this requirement, the electromagnetic field must be such that no electric field lines connect the plasma with the metal walls. FIG. 2 shows an electromagnetic wave of the $TE_{110}$ mode in a spherical cavity which has its electric field lines closing on themselves and thus meeting the requirements. As indicated in FIG. 2, the electromagnetic energy oscillates between a purely toroidal E field and poloidal B field. It will be noted, however, that there are two points, A and A' at which the confining force is zero and such points will exist for any instantaneous field configuration as long as the plasma region is equivalent to a sphere as shown.

To eliminate the singularities at points A and A', use is made of the three-fold degeneracy of this resonant frequency in a spherical cavity. If the even and odd TE$_{111}$ electromagnetic wave modes are excited in time quadrature, the instantaneous field structure will be as shown in FIG. 3 and will rotate around the axis B—B' causing the time average of the containing force to be positive and pointing towards the cavity center at all points of the plasma surface. Although the plasma is shown as a sphere in FIG. 3, it will obviously not be spherical in practice since a sphere would be subjected to a magnetic pressure varying as $(1+\sin^2 \theta)$ is the angle between the equatorial plane designated C—C' in FIG. 3 and the radius vector D.

The charged particles are subjected to an oscillatory force tending to make them vibrate in paths along concentric spheres around the axis B—B' in FIG. 3. They are also subjected to a positive force directing them toward the center of the cavity. In each half wave of oscillation, each of the charge particles is caused to deflect inward toward the center of the cavity thereby forming a plasma core having a rather sharp plasma boundary.

There are two distinct facets to the stability problem of confining plasma by means of radio-frequency electromagnetic fields. One concern is the stability of individual particle orbits while the other relates to the stability of the boundary between the plasma and the field.

The question of stability of particle orbits arises through detailed consideration of the mechanism of electron containment. Electrons coming from the plasma interior with thermal velocities encounter a time average electric field gradient in the boundary layer and are thus reflected by the time average force toward the center of the plasma as hereinbefore described. Momentum transfer to the field then occurs causing the pressure balance condition to be satisfied. Possible deleterious effects, however, are connected with stability or instability of the periodic motions which are more or less perpendicular to the confining force. Rapid temporal growth of these motions would result in loss of electrons from the core and failure of the containment mechanism. Mathematically, it may be shown that the motion is at worst on the boundary of the stable zone for any value of the field gradient, and, since it is not possible to obtain a pure rotating field at all parts of the plasma surface, electron orbits in the boundary layer generally do tend to grow in amplitude. This instability may be suppressed, however, by introducing a steady magnetic field having a component parallel to the axis of rotation B—B' of FIG. 3. An actual field strength approaching the magnitude of the RF field at the plasma surface is sufficient to suppress the instabilities. In any case, this form of instability is not serious for large cores since it is essentially a surface effect. At large core sizes, the electrons speed a smaller fraction of their time in the boundary layer and hence have more chance to lose energy in the plasma interior. In smaller radio frequency machines, where power output is unimportant, the electron orbit instability might be suppressed by the addition of high atomic number (Z) materials with their attendant excitation, ionization, and radiation cross-sections which would help to hold down the electron energies.

For the purposes of discussing the stability problem of plasma field interface, it may be assumed that it depends only on the complexion of the time average forces acting on the plasma. Other effects are included in the electron orbit analysis outlined above. Deformations of the plasma field interface will ordinarily occur on a time scale short compared to but considerably longer than $$\frac{E_f^2}{\omega} = a \text{ constant}$$

Thus, if the plasma interface surface tends to increase, the volume of the cavity between the cavity outer wall and the conducting plasma decreases. The decreasing cavity volume results in an increased electromagnetic field frequency which increases the field energy as seen in the equation above. The increased field energy represents itself as an increase in the time average force towards the center of the plasma thereby opposing the initial increase in the plasma interface surface.

A similar explanation may be used to show the stability mechanism against short wave length perturbations. To see this, consider a square wave perturbation such as is shown in FIG. 4. The electric field is generally small in the vicinity of the plasma surface so that its mechanical effects may be ignored. Since the electromagnetic field is attenuated at the base of the slots, the work done on the field by the outward deformation exceeds that subtracted by the inward movement. The resonant frequency and thus the field energy are thereby increased leading to a stable state of the plasma interface.

For gross deformations of the plasma core, involving perturbation wave lengths comparable to the core dimensions, stability may also be obtained by introduction of a steady magnetic field, as mentioned above, which is of a strength approximately equal to the strength of the RF electromagnetic field.

Consideration is now given to an actual facility for containing and compressing a plasma discharge in a stable manner by means of electromagnetic fields. FIG. 5 illustrates a radio frequency machine 10 comprising a metal sphere 12 defining a spherical cavity 14 in which the plasma discharge is confined and compressed by the electromagnetic field. The metal sphere 12 is strong enough to withstand the hard vacuum applied to the cavity 14 and is constructed of two hemispheres of ⅜ inch thick steel which meet along the equatorial plane perpendicular to the axis of rotation B—B'. The interior of the sphere 12 is lined with a highly conductive material which aids in establishing a suitable confining electromagnetic field. A copper or silver lining .005–.010 inch thick bonded or plated to the interior surface of the steel sphere 12 is sufficient for this purpose. A chosen operating frequency of 715 megacycles per second dictates a spherical cavity 14 having a radius of 0.3 meter. For operation at a density of $2 \times 10^{18}$ per meter$^3$ and a temperature of 1 kev., the electromagnetic field power requirement is approximately 1.0 megawatt producing a confining field of approximately 420 gauss at the plasma interface. As hereinbefore described, the formation and compression of a plasma core is accompanied by an increase in cavity resonant frequency of the order of 10 to 15% within a time period of from 10 to 100 microseconds. The RF generator system must, therefore, have broad band characteristics.

High power broad band tubes such as triodes or beam power tetrodes having an upper frequency limit of the order of 500 to 1000 megacycles are adaptable for use in a radio frequency machine of this type. The system shown in the drawings and herein described utilizes eight (only four shown) water cooled, ceramic envelope, beam-power tetrodes 18 capable of about 170 kilowatts power output up to 800 megacycles in long pulse service. RCA A2515D beam power tetrodes have these characteristics and four of these are used to generate each mode of RF energy in the cavity 14.

Coupling loops 20 transmit RF energy from the tubes 18 to the evacuated cavity 14 through ceramic domes 22 and 22a. Reference is made to FIG. 6 which shows the construction of the ceramic dome 22 with the coupling loop 20 therein. Each dome 22 is fabricated of a strong ceramic such as pyroceram and is welded to a metal ring 23 attached to the outside of the steel sphere 12.

The ceramic domes 22 enclosing the coupling loops 20 for one mode of RF energy are positioned on a great circle of the sphere which is included in the plane of FIG. 5. The other mode of RF energy is generated by the four tetrode tubes (not shown) which have their coupling loops within the ceramic domes 22a which are positioned on a great circle lying within a plane through the axis of rotation B—B' and perpendicular to the plane of FIG. 5. When the two sets of tetrodes are synchronized to operate in time quadrature, a revolving electromagnetic field such as is shown in FIG. 3 will be established in the cavity 14.

The eight tube feed system as shown in FIG. 5 was chosen in preference to a simpler two tube feed system to keep the cavity Q as high as possible. RF power radiation through an aperture varies about as the 6th power of the diameter whereas the peak power transmission is limited by voltage breakdown and hence varies only as the square of the diameter. The reduction in Q is therefore less for the eight tube system.

*Table I*

| | | |
|---|---|---|
| Filament power | kw | 2.7 |
| Plate voltage | kv | 24 |
| Plate current (peak) | amp | 13 |
| Power output (peak) | kw | 170 |
| Power gain | | 100 |
| Cooling water | g.p.m | 20 |

The beam tetrodes 18 are adapted to operate as self-excited, grid-driven oscillators and are so connected that they follow any resonant frequency changes that occur during the formation and subsequent confinement of the plasma. The empty cavity resonates at 715 megacycles and a fully developed plasma core of ⅓ the radius of the cavity raises this to 800 megacycles. The RF generating system may be made to follow this frequency shift by minimizing the stored energy in the external circuit elements and by making the main cavity an integral part of the feed-back path for the oscillators. By connecting the grid 24 of each tube 18 through an amplifier and phase shift network 26 to a coupling loop 27 penetrating into the cavity 14, the frequency changes caused by the compression of the plasma will be fed back to the tube adjusting the frequency output accordingly.

The device 10 as described may be used in a single pulse or a repetitive pulse operation. The output of the tubes 18 may be pulsed by pulsing means within the plate supply 28 furnishing power to each of the tubes 18. The device may also be operated as a steady state machine by eliminating pulsing means within the plate supply 28, providing RF tubes capable of megawatt operation on a steady basis are used.

As hereinbefore discussed, a steady magnetic field through the cavity 14 parallel to the axis of rotation B—B' will serve to aid in stabilizing the electron orbits over the plasma interface thereby reducing the probability of escape. To establish the magnetic field, a coil 29 is provided, and is oriented as shown in FIG. 5, so that the magnetic field lines set up by a current therethrough supplied by a current source 29a, will have a component parallel to the axis of rotation B—B'. A field strength approximately equal to the magnetic field established by the RF system or 420 gauss will suffice for this purpose.

A high quality vacuum system to insure adequate control of gas purity is an essential of the facility. A critical feature of this system is the design of cavity pumping ports. These ports must have adequate evacuating conductance, but should not appreciably affect the cavity Q nor contribute to the excitation of spurious RF modes. A study of the current density vectors at the surface of a cavity for the electromagnetic excitation of the type used in this device will show that the vector locus at the great circle which is perpendicular to the axis of rotation B—B' and the plane of FIG. 5 is a straight line, and that the RF current flow is always perpendicular to the plane. The average magnitude of the current density is a minimum at the plane. A large number of small slots 30 elongated in the direction of the current vector will thus provide a minimum of distortion of the electromagnetic field modes. In the device herein described, 60 slots, 6 millimeters wide and 3 centimeters high are provided. The slots 30 provide communication between the cavity 14 and a vacuum manifold 32.

The vacuum manifold 32 comprises a flanged annular L-cross section member 34 welded to each separable hemispherical portion of the metal sphere 12. The flanges 36 on annular members 34 are held together by bolts 38 (FIG. 7) which thereby serve to secure the two, separable hemispheres together three gold O-rings 40, 40a, and 40b of increasing diameters are positioned between the confronting flanges 36 to seal the interior of the metal sphere 12. An air outlet line 42 is connected to the space between the two innermost O-rings 40 and 40a, and leads to a mechanical pump (not shown) to reduce any leakage therethrough.

The main pumping system (FIG. 5) comprises a diffusion pump 44, connected through an appropriate oil vapor baffle 46 and shut-off valve 48 to the vcuum manifold 32. Any standard diffusion pump such as an MCF–300 pump using octoil may be used in the pumping system which will operate to evacuate the interior of the metal sphere 12 at a pumping rate of approximately 50 liters per second.

The oil vapor baffle 46 comprises a tank 50 which is connected by means of line 52 to a liquid nitrogen source (not shown). A number of concentric copper baffles 54 surround the tank 50 and are interconnected by webs (not shown) to allow the passage of gases therethrough. An extra baffle plate 56 minimizes the effects of oil vapor back-streaming from the diffusion pump.

The shut-off valve 48 comprises a housing 57 within which is a disk 58 actuatable by a spindle 60 and a hand wheel 62 to lodge it against a valve seat 64. A flexible baffle 66 is connected between the disk 58 and the valve housing to prevent the passage of gas through the spindle mechanism. The shut-off valve operates to isolate the vacuum system from the steel sphere during the formation and compression of the plasma discharge. It is to be understood that other types of vacuum pumps, such as the continuous ion-getter type, and shut-off valves as well as baffle systems may be used to establish the vacuum within the sphere 12. Whatever pumping system is used, however, it should be capable of reducing the pressure within the sphere to approximately $10^{-10}$ millimeters of mercury.

A gas inlet line 68 connected to the manifold 32 supplies the gas to be ionized into the interior of the metal sphere 12. The mixture used in the embodiment herein described comprises approximately 50% by volume of each of the gases tritium and deuterium and it is introduced to a base pressure of approximately $10^{-6}$ to $10^{-3}$ millimeters mercury. A vacuum pressure gauge 70 connected to the manifold 32 by a gas line 72 measures the pressure within the sphere. A pressure gauge of the Bayard-Alpert ion type may be used as well as any other pressure gauge which is capable of measuring high vacua.

To dissipate the heat in the cavity walls, cooling coils 74 surround the metal sphere 12. Water or other suitable cooling means is circulated through the cooling coils 74 by a pump 76 which passes the heated water to a conventional heat exchanger 78. The heat transferred in the heat exchanger may be dissipated to the atmosphere or it may be converted to electrical power through well known steam conversion and turbine-generator means.

Referring to the operation of the device hereinbefore described, the cavity 14 within the metal sphere 12 is pumped out to the desired pressure of approximately $10^{-10}$ millimeters mercury. The system is then preferably outgassed by baking the entire system in a baking oven at an elevated temperature in the neighborhood of 400° C.

There are two alternatives for operation subsequent to the establishment of the vacuum. The gaseous mixture of deuterium and tritium may be introduced to the cavity to a base pressure in the range of $10^{-6}$ to $10^{-3}$ millimeters of mercury after which the RF field may be brought up to a power. In the alternate mode of operation, the RF field is established after which the gas is introduced. The gases will be caused to ionize and due to the oscillations of the electromagnetic field, the ionized particles produced within the volume interior to the maximum E field will be directed toward the center of the cavity thus establishing the plasma. The magnetic confining force of approximately 420 gauss is established at the plasma interface and compresses the plasma to a volume approximating 0.20 meter diameter.

The principal design characteristics of the hereinbefore described device are summarized below.

*Table II*

| | |
|---|---|
| Cavity diameter | 60 cm. |
| Empty cavity frequency, $TE_{110}$ mode | 715 mc. |
| Loaded cavity frequency | 800 mc. |
| Empty cavity Q (a figure of merit as shown in column 4) | ~100,000. |
| RF pulse length | 1–10 milliseconds. |
| RF pulse power | 0.5–1.0 mw. |
| Cavity filling time | ~25 microseconds. |
| RF plate supply capacitor bank | $10^5$ joules, 50 kv. |
| Cavity ultimate pressure | $10^{-10}$ mm. Hg. |
| Operating base pressure | $10^{-6}$ to $10^{-3}$ mm. Hg. |
| Floor space requirement | 1500 ft.$^2$. |

It is interesting to inquire if devices such as hereinbefore described can be scaled up to actual power reactors. The magnitudes in FIG. 1 appear quite reasonable; however, it is an unpleasant fact that any contact between the electromagnetic field and ordinary metallic conductors causes the power balance to be dominated by skin losses in these conductors. The result is to raise the minimum density and power levels into seemingly impractical regions several orders of magnitude higher than that in the above example. The following table contains some calculated power relationships for two different sized machines wherein the field shown in FIG. 3 of the drawings is used to confine plasma at a density of $2 \times 10^{21}$ per meter$^3$ and a temperature of 10 kev. Electrical constants for the walls are taken to be those of silver.

*Table III*

| | | |
|---|---|---|
| Frequency, mc | 80 | 800 |
| Radius of cavity, m | 3 | 0.3 |
| Radius of plasma, m | 1 | 0.1 |
| Energy content of plasma, mj | 13.4 | 0.0134 |
| Power input to walls, mw | 164,000 | 5,200 |
| Power from T-D reaction, mw | 324 | 0.324 |

It is seen that the power situation is completely dominated by the skin effect in the metal walls. The power level at which the input to the wall is equal to the thermonuclear output from the plasma is independent of size and depends only on the plasma temperature and the geometry of the system. For the particular temperature and proportions used in calculating the values in the table, this break-even power is approximately $0.83 \times 10^{14}$ watts.

Consideraton of the data in the preceding table together with the associated discussion shows that practical use for power production of such machines as thermonuclear reactors must be accompanied by substantial reductions in skin effect power dissipation. Such reduction would be quite effective, for instance, if the skin losses could be reduced by a factor of 100 wherein the break-even power given above would be lowered by the square of the same number to the conceivable value of 8300 megawatts.

Looking at the problem from a systems point of view, it is evident that the heating in the metal walls is to be regarded as a loss only if the power involved must be handled by external devices and fed back into the magnetic field. If it were possible for the field to be maintained directly by the fast charged reactions products, the skin dissipation would then represent useful power output. Energy transfer from fast charged particles does indeed occur, for example, in such electronic devices as klystrons and magnetrons. It may be argued that any particles that do escape will have to work against the confining force and hence give energy to the electromagnetic field.

It will be seen that the invention as hereinbefore described fulfills the objects set forth above. It is not intended to limit the present invention by the foregoing description, but instead, reference is made to the following claims for the precise definition of the scope of this invention.

What is claimed is:

1. A device for confining and compressing a plasma discharge comprising a metal housing defining a spherical cavity, said housing having a plurality of equi-spaced ports located on a great circle of said spherical cavity, means for exciting electromagnetic waves within the said cavity of the even and odd $TE_{111}$ modes in time quadrature to rotate about an axis of said spherical cavity perpendicular to the plane including said great circle, means in communication with said ports for introducing a heavy hydrogen isotope gas into the cavity at extremely low pressure, whereby the gas will be ionized and compressed towards the center of the spherical cavity by said electromagnetic waves.

2. The device of claim 1 comprising in addition, means for establishing a D.C. magnetic field parallel to said axis of rotation.

3. A device for confining and compressing a plasma discharge comprising, a metal sphere defining a spherical cavity, means for exciting electromagnetic waves within said cavity of the even and odd $TE_{111}$ modes in time quadrature to rotate about an axis including the center of said spherical cavity, and means for introducing a gas comprising heavy hydrogen isotopes into the cavity at extremely low pressure, whereby the gas will be ionized and compressed towards the center of said cavity by said electromagnetic waves.

4. The device of claim 3 comprising in addition means for providing a D.C. magnetic field parallel to said axis of rotation.

5. A method for confining and compressing a plasma discharge comprising evacuating a radio-frequency spherical resonant cavity, introducing a heavy hydrogen isotope gas into said cavity at extremely low pressure, and exciting electromagnetic waves of the even and odd $TE_{111}$ modes in time quadrature to rotate about an axis through the center of said spherical cavity, whereby said gas will be ionized and the charged particles will be directed towards the center of said cavity.

6. A method for confining and compressing a plasma discharge comprising evacuating a radio-frequency spherical resonant cavity, exciting electromagnetic waves within said cavity of even and odd $TE_{111}$ modes in time quadrature to rotate about an axis through the center of said spherical cavity, and introducing a heavy hydrogen isotope gas into the cavity at extremely low pressure, whereby the gas will be ionized and the charged particles will be directed towards the center of the cavity.

7. A method for confining and compressing a plasma discharge comprising evacuating a radio-frequency spherical resonant cavity, introducing a heavy hydrogen isotope gas into the cavity at extremely low pressure, exciting electromagnetic waves within said cavity of the even and odd $TE_{111}$ modes in time quadrature to rotate about the axis through the center of said spherical cavity and a steady D.C. magnetic field parallel to said axis of rotation, whereby said gas will be ionized and the charged particles therein will be directed towards the center of said cavity.

8. A method for confining and compressing a plasma discharge comprising evacuating a radio-frequency spherical resonant cavity, exciting electromagnetic waves within said cavity of the even and odd $TE_{111}$ modes in time quadrature to rotate about an axis through the center of said spherical cavity and a steady D.C. magnetic field parallel to said axis, and introducing a heavy hydrogen isotope gas into the cavity at extremely low pressure, whereby the gas will be ionized and the charged particles will be directed towards the center of said cavity.

References Cited in the file of this patent

UNITED STATES PATENTS

| 2,403,303 | Richmond | July 2, 1946 |
| 2,409,227 | Shockley | Oct. 15, 1946 |

OTHER REFERENCES

Australian Journal of Physics, vol. 10, Mar. 1957, No. 1, pages 221–225 (an article by Knox).

Atomic Industry Reporter, News and Analysis; Official Text Section 1958; Library No. TK 9001 A7; issue of Jan. 29, 1958, pages 54:5–54:11.

Proceedings of the Second United Nations International Conference on the Peaceful Uses of Atomic Energy; vol. 32 (1958), pages 324–332 (an article by Butler et al.); pages 239–244 (an article by Venedov et al.).

Nuclear Instruments and Methods, June 1959, vol. 4 (No. 5), pages 327–331 (an article by Braams et al.).